Sept. 23, 1947.    W. SEAMAN    2,427,996
TEMPERATURE COMPENSATOR FOR REFRACTOMETERS
Filed Sept. 28, 1944

INVENTOR
WILLIAM SEAMAN,
ATTORNEY

Patented Sept. 23, 1947

2,427,996

UNITED STATES PATENT OFFICE 2,427,996

TEMPERATURE COMPENSATOR FOR REFRACTOMETERS

William Seaman, New York, N. Y., assignor to American Cyanamid Company, New York, N. Y., a corporation of Maine Application September 28, 1944, Serial No. 556,271

14 Claims. (Cl. 250—41.5)

1

This invention relates to an improved apparatus for continuously analyzing a fluid stream for a plurality of components of varying refractive indices and more particularly to an apparatus for transforming changes in refractive index of the fluid stream into electrical currents.

There are many reactions in which a fluid mixture is involved, the composition of which is to be carefully measured and if desired controlled. Examples of such mixtures are solutions of dicyandiamide in liquid ammonia for use in the production of melamine, reaction mixtures for producing acrylonitrile by the interaction of hydrocyanic acid and ethylene oxide and the like. In such reactions it is important to know at all times the chemical constitution of the mixture or at least the concentration of one or more components therein and it is desirable in many cases to effect automatic control which will keep the composition of the reaction mixture within certain predetermined limits. The present invention is applicable to all processes in which a fluid reaction mixture changes its refractive index with changes in composition.

A proposal has been made in the past to effect a control or measurement by passing a sample of a multicomponent fluid through a hollow prism, passing light therethrough and causing the spectrum produced to impinge through a wide slot onto a photocell. Changes in refractive index result in a shift of the spectrum produced and when the spectrum is normally located either missing the slot or covering substantially all of the slot, a movement of the spectrum will result in a greater or small proportion thereof being cut off so that the amount of radiant energy striking the photocell will vary and it has been proposed to utilize suitable relay circuits to be actuated by these variations in photocell current. The arrangement proposed was open to many serious practical disadvantages. The change of photocell current with change of refractive index was relatively slow because until the spectrum had been moved a considerable distance so that a fairly large proportion of the light no longer struck the photocell there was not sufficient difference in photocell current to effect reliable control. An even more serious disadvantage lay in the fact that measurement and control depended entirely on differences in photocell current and these differences depended not only on the change of refractive index of the fluid being measured but also on the intensity of light emitted by the light source and the color transmission of the fluid medium. Any factors af-

2 fecting either of these characteristics would be treated by the photocell as changes in radiant energy striking it and it would correspondingly behave in a similar manner as in the case of a shift of the spectrum due to change in refractive index. In other words, the device was not reliable for precise work and was apt to give false readings.

In the application of Robert Bowling Barnes, Serial No. 423,366, filed December 17, 1941, there is described a greatly improved device which is substantially unaffected by fluctuations in the light source and operates within wide limits regardless of transparency of the fluid passing through the prism of the control device. The Barnes apparatus provides a narrow band of monochromatic light from a slit interposed in front of a source of illumination followed by a filter, if the illumination is from a continuous emitter, or preferably utilizing a source which produces a spectrum containing one or more narrow luminous bands or lines, for example, a high pressure mercury arc. This narrow band or line of light, after passing through the control prism through which the liquid flows, is imaged on a slit or on a plane containing a knife edge which defines one side of a slit. Any change in refractive index moves the image of the narrow luminous line and a very accurate on and off control is obtained by placing a photocell behind the slit. So sharp and sensitive is the device that in a commercial installation a shift of the light of a millimeter or less results in a relatively enormous change in photocell current, the change being that between dark cell current and full illumination. Currents from the photocell of the Barnes refractometer may be amplified by known means, such as for example, a mirror galvanometer with a bright light source and suitably positioned photocells or other known means for transforming the current into an indication or actuation of a control device.

In spite of the enormous improvement which is represented by the Barnes device and which for the first time makes completely reliable control through refractive index changes a commercial reality, there still remains one problem. In the Barnes instrument temperature changes the refractive index of the fluid flowing through a hollow prism. Unfortunately fluids change their refractive index quite materially with temperature and in commercial installations where the fluid is a small sample taken from a large apparatus in which a process is going on, temperature change may be unavoidable and false indication may result due to change of refractive index with temperature unless care is taken to assure a constant temperature of the fluid. While it is possible to obtain such temperature regulation the thermostatic means necessary are cumbersome and delicate and are frequently unsuitable for installations in commercial plants. It is, therefore, customary to adjust the Barnes refractometer when changes of temperature take place. This requires skilled supervision.

The present invention is an improvement on the Barnes device which automatically compensates for temperature changes. Essentially the present invention utilizes two symmetrical reversed prisms, one of the prisms containing a material which changes its refractive index with temperature at substantially the same rate as the liquid to be measured. In control installations this may be the composition of liquid which it is desired to maintain. The other prism has flowing through it liquid from the process to be controlled or measured. Both prisms are surrounded with water or other suitable fluid and sufficient heat exchange is provided between the incoming fluid to be measured and the liquid surrounding the two prisms so that the temperature of the liquid in both prisms is maintained the same. Changes in refractive index with temperature will, therefore, be the same in each prism but since the prisms are reversed the two effects will exactly cancel each other leaving only differences in composition of the liquids in the two prisms to deviate the image of the bright line which is issued in the device as well as in the Barnes device.

By means of the present invention automatic operation is assured even though there may be very wide temperature fluctuations. This completely eliminates the necessity for any manual adjustment and provides complete automatic operation which saves the cost of supervision. In addition the automatic operation permits placing the device of the present invention in locations where it would not be accessible to manual adjustment and, therefore, opens up new fields for controllers which were not open to the original Barnes instrument.

It is an advantage of the present invention that automatic operation is obtained without any costly additional equipment. Prisms, transparent containers and heat exchange coils are very cheap and, therefore, the improved instrument of the present invention can be produced at substantially the same cost as the original Barnes instrument. This is an important advantage as it permits the sale of automatic instruments at no substantially increased price so that they are available in fields where instruments of very great cost would be economically impracticable.

A further advantage of the present invention lies in the fact that the additional equipment is rugged and simple and does not introduce any material additional maintenance or breakage problems.

Because the effect of temperature is compensated, it is possible to locate controllers of the present invention at considerable distances from the apparatus or processes to be controlled, because changes in temperature of the fluid flowing through relatively long conduits do not impair the accuracy of instruments according to the present invention. This is a very real practical operating advantage because frequently the conditions immediately adjacent to an apparatus in which a continuous reaction is occurring are poorly suited for precise measuring instruments and it is an advantage of the present invention that the measuring instrument may be located a considerable distance from the apparatus to be controlled in a more suitable position. Thus, for example, a series of instruments may be located in a central control position where the control of a number of units may be centralized.

The invention will be described in more detail in conjunction with the drawings, in which.

Figure 1:
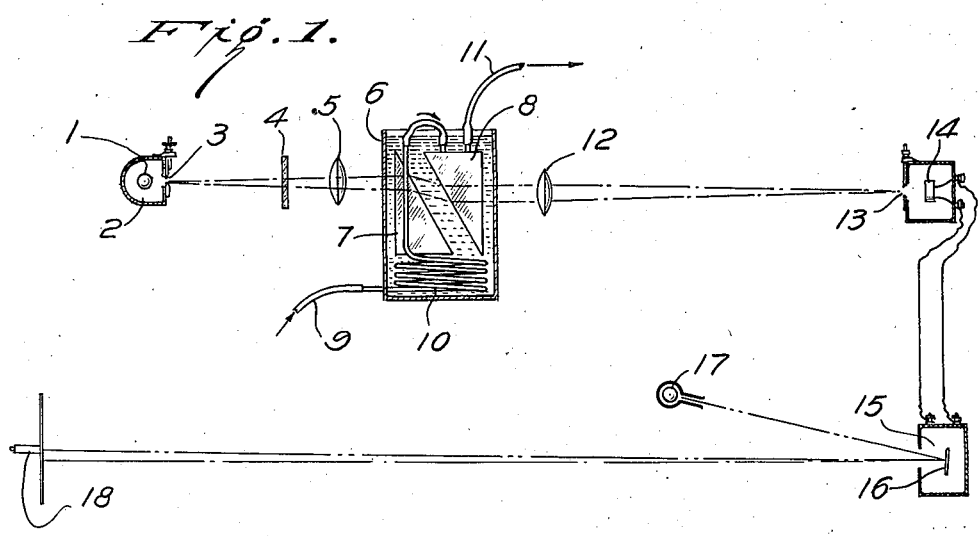
Fig. 1 is a diagrammatic representation, partly in section, of a typical device according to the present invention.

The device according to the present invention consists of a light source 1 in a suitable housing 2 provided with an adjustable slit 3 which is the light source for the succeeding optics. A filter 4 may be interposed in the light beam if the light source is one which emits a continuous spectrum. When a light source emitting a line spectrum is used, such as a high pressure mercury arc, the filter is, of course, superfluous and may be omitted. The substantially monochromatic light either produced directly from the light source or by means of the filter 4 passes through the collimating lens 5 which transforms light from the slit 3 into a parallel beam. This beam then enters a transparent cell 6 filled with water or other suitable liquid. As the beams enter normal to the cell surface the cell does not introduce any deviation. Within the cell there are placed two symmetrical hollow transparent prisms 7 and 8. The prisms are reversed. In prism 7 there is a fluid of suitable refractive index, normally a solution of the composition which is to be maintained. Prism 8 is provided with an inlet and an outlet 11. Liquid from the process to be controlled flows from pipe 9 into a coil 10 at the bottom of the cell 6 and thence into the prism 8. The surface of the coil 10 is such that the liquid flowing into the prism 8 is brought to the same temperature as the liquid surrounding the prism 7. The whole system, including both prisms 7 and 8, is at a common temperature. Any change in refractive index due to temperature changes is completely compensated because the prisms 7 and 8 are reversed and are symmetrical. The parallel beam passing through the prisms and displaced thereby then passes through the lens 12 which images the slit 3 onto the plane of the slit 13. The photocell 14 is located back of the slit 13 and is connected to a sensitive galvanometer 15 provided with a mirror 16 on which a beam of light from a source 17 strikes. The beam is reflected and in a predetermined position of the mirror 16 will strike a photocell 18.

In operation the slit 13 is adjusted so that when the composition of the liquid in prism 8 is the same as in prism 7 the image of slit 3 will either just strike slit 13 or will just miss it. If it is adjusted so that it just strikes slit 13 any change in composition of the liquid in prism 8 will shift the image formed by the lens 12 and will cause it to miss the slit 13. The photocell 14 will then be no longer illuminated, the current through the galvanometer 15 will change drastically and the mirror 16 will move. In the diagram the photocell 18 is shown in a position so that it will be struck when the mirror 16 moves but is normally unilluminated. The relatively powerful current from the photocell 18 may be used to operate through suitable relays indicating instruments or to control the process so as to bring the composition of the liquid in prism 8 back to the predetermined point at which time the light will once again strike the slit 13, and the photocell 18 will be de-energized. The relays from photocell 18 are conventional and since they form no part of the present invention are not shown.

Figure 2:
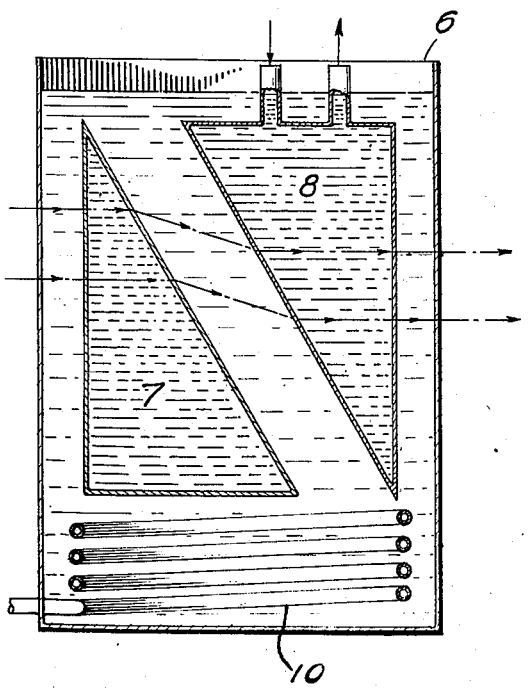
Fig. 2 is an enlarged detailed view of the controlling prisms of Fig. 1.

Fig. 2 shows an enlarged view of the two prisms and illustrates the fact that when there is a change in refractive index due to temperature change this is exactly compensated and the only deviation is that due to difference in refractive index between prisms 7 and 8.

Figure 3:
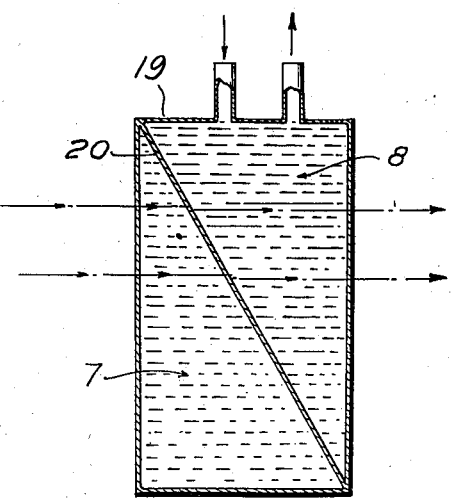
Fig. 3 is an enlarged detailed view of a simple form of controlling prism.

The device of Figs. 1 and 2 comprises separate hollow prisms which may be separated by the liquid in the cell 6. This requires four accurately aligned prism faces and the alignment of the two prisms with respect to each other must also be maintained. I prefer to form the two prisms in a single unit as is shown in Fig. 3, which shows in section a rectangular cell 19 provided with dividing wall 20. This divides the cell into two prisms which are entirely symmetrical, and as the wall 20 is common to both no difficulty in alignment results. This construction is preferred by reason of its simplicity and ruggedness. The operation of the device, of course, is identical with that of Figs. 1 and 2.

In the preferred modification shown in Fig. 3 it is possible to construct the dividing wall 20 of material which is a good conductor of heat, for example, a metal, and providing it with a transparent window where the beam actually passes through. Such a construction permits elimination of a cell surrounding the double prism and the further complication of a coil to effect heat exchange.

I claim:

1. A device for transforming changes of refractive index of a liquid due to changes in the composition of the liquid into electrical currents which comprises, in combination and in optical alignment, means, including a source of radiation, for producing a narrow luminous line of radiation of narrow wave length range, two right angled prisms symmetrically arranged apex to base, one prism containing material of refractive index which changes with temperature at substantially the same rate as the liquid to be measured, means for circulating the liquid through the other prism, the first prism being in sufficiently close heat exchange relation with the liquid to be measured passing through the other prism so that the temperature in the two prisms remains substantially equal, a straight edge parallel to the axis of the line of radiation and a photoelectric device mounted back of it, means for producing from said narrow luminous line as a source a collimated beam of radiation of the narrow wave length range striking one side of one prism normally and passing through the two prisms, and means for converging the beam after leaving the prisms to form an image of said luminous line in the plane of the straight edge and parallel and adjacent thereto, the orientation of the prisms being such that changes in the refractive index of the liquid to be measured which are due to changes in the composition of the liquid cause the image of the luminous line to move transversely of the straight edge.

2. A device for transforming changes of refractive idex of a liquid due to changes in the composition of the liquid into electrical currents which comprises, in combination and in optical alignment, means, including a source of radiation, for producing a narrw luminous line of radiation of narrow wave length range, a transparent cell with two parallel walls filled with transparent liquid, two prisms in said cell symmetrically arranged apex to base, one side of each prism being parallel to said walls, one prism containing fluid of refractive index which changes with temperature at substantially the same rate as the liquid to be measured, means for circulating the liquid whose changes in refractive index are to be transformed into electrical currents first through a heat exchange device submerged in the liquid of the transparent cell and then through the second prism, a straight edge parallel to the axis of the line of radiation and a photoelectric device mounted back of it, means for producing from said narrow luminous line as a source of collimated beam of radiation striking the cell normally and passing through the two symmetrically arranged prisms, and means for converging the beam after leaving the cell to form an image of said luminous line in the plane of the straight edge and parallel and adjacent thereto, the orientation of the prisms being such that changes in the refractive index of the fluid due to changes in the composition thereof in said second prism cause the luminous line to move transversely of the straight edge and in the plane of the spectra formed by the prisms.

3. A device for transforming changes of refractive index of a liquid due to changes in the composition of the liquid into electrical currents which comprises, in combination and in optical alignment, means, including a source of radiation, for producing a narrow luminous line of radiation of narrow wave length range, two right angled prisms symmetrically arranged apex to base, one prism containing material of refractive index which changes with temperature at substantially the same rate as the liquid to be measured, means for circulating the liquid through the other prism, the first prism being in sufficiently close heat exchange relation with the liquid to be measured passing through the other prism so that the temperature in the two prisms remains substantially equal, means for producing from said narrow luminous line as a source a collimated beam of radiation of the narrow wave length range parallel to axes of the prisms and striking one side of one prism normally and passing through the two prisms, and means for converging the beam after leaving the prisms to form an image of said luminous line in a plane, a slit, adjustable in width and movable as a whole in said plane, the slit being parallel to line of radiation and positioned adjacent the image of the line, and the slit being parallel thereto.

4. A device according to claim 1 in which the prisms consist of a transparent rectangular cell and a transparent dividing wall dividing the cell into two prisms symmetrically arranged apex to base, one of which has inlet and outlet means included in said circulating means.

5. A device according to claim 3 in which the prisms consist of a transparent rectangular cell and a transparent dividing wall dividing the cell into two prisms symmetrically arranged apex to base, one of which has inlet and outlet means included in said circulating means.

6. A device according to claim 1 in which the source of radiation emits a line spectrum and means are provided to limit the radiation forming said image to that from a single line of said spectrum.

7. A device according to claim 3 in which the source of radiation emits a line spectrum and means are provided to limit the radiation forming said image to that from a single line of said spectrum.

8. A device according to claim 2 in which the source of radiation emits a line spectrum and means are provided to limit the radiation forming said image to that from a single line of said spectrum.

9. A device according to claim 1 in which the prisms consist of a transparent rectangular cell and a transparent dividing wall dividing the cell into two symmetrically arranged prisms, one of which has inlet and outlet means included in said circulating means, and the source of radiation emits a line spectrum and means are provided to limit the radiation forming said image to that from a single line of said spectrum.

10. A device according to claim 3 in which the prisms consist of a transparent rectangular cell and a transparent dividing wall dividing the cell into two symmetrically arranged prisms, one of which has inlet and outlet means included in said circulating means, and the source of radiation emits a line spectrum and means are provided to limit the radiation forming said image to that from a single line of said spectrum.

11. A device according to claim 2 in which the prisms consist of a transparent rectangular cell and a transparent dividing wall dividing the cell into two symmetrically arranged prisms, one of which has inlet and outlet means included in said circulating means, and the source of radiation emits a line spectrum and means are provided to limit the radiation forming said image to that from a single line of said spectrum.

12. A device according to claim 1 in which the prisms consist of a transparent rectangular cell and a transparent dividing wall dividing the cell into two symmetrically arranged prisms, one of which has inlet and outlet means included in said circulating means, and the source of radiation is a high pressure mercury arc provided with a slit included in said means for forming a narrow line of radiation.

13. A device according to claim 3 in which the prisms consist of a transparent rectangular cell and a transparent dividing wall dividing the cell into two symmetrically arranged prisms, one of which has inlet and outlet means included in said circulating means, and the source of radiation is a high pressure mercury arc provided with a slit included in said means for forming a narrow line of radiation.

14. A device according to claim 2 in which the prisms consist of a transparent rectangular cell and a transparent dividing wall dividing the cell into two symmetrically arranged prisms, one of which has inlet and outlet means included in said circulating means, and the source of radiation is a high pressure mercury arc provided with a slit included in said means for forming a narrow line of radiation.

WILLIAM SEAMAN.